(12) United States Patent
Kashima

(10) Patent No.: US 9,429,787 B2
(45) Date of Patent: Aug. 30, 2016

(54) TRANSPARENT DISPLAY UNIT

(71) Applicant: BOE TECHNOLOGY GROUP CO., LTD., Beijing (CN)

(72) Inventor: Miki Kashima, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 236 days.

(21) Appl. No.: 13/825,876

(22) PCT Filed: Oct. 11, 2012

(86) PCT No.: PCT/CN2012/082803
§ 371 (c)(1),
(2) Date: Mar. 25, 2013

(87) PCT Pub. No.: WO2013/127181
PCT Pub. Date: Jun. 9, 2013

(65) Prior Publication Data
US 2013/0222739 A1    Aug. 29, 2013

(30) Foreign Application Priority Data
Feb. 29, 2012 (CN) .......................... 2012 1 0050681

(51) Int. Cl.
*G02F 1/1334* (2006.01)
*G02F 1/1347* (2006.01)
(Continued)

(52) U.S. Cl.
CPC ....... *G02F 1/13342* (2013.01); *G02F 1/13473* (2013.01); *G02F 1/13475* (2013.01); *G02F 1/133555* (2013.01); *G02F 2001/133742* (2013.01)

(58) Field of Classification Search
CPC ............. G02F 1/13342; G02F 1/1334; G02F 1/133555; G02F 1/13473
USPC .............................. 349/74, 86, 114, 123–136
See application file for complete search history.

(56) References Cited

U.S. PATENT DOCUMENTS 5,305,126 A *  4/1994  Kobayashi et al. ............ 349/94
5,712,695 A     1/1998  Tanaka et al.
(Continued)

FOREIGN PATENT DOCUMENTS

CN          1040213 A       3/1990
CN          1181568 A       5/1998
(Continued)

OTHER PUBLICATIONS

International Search Report: dated Jan. 17, 2013 PCT/CN2012/082803.
(Continued)

*Primary Examiner* — Paul Lee
*Assistant Examiner* — Jia Pan
(74) *Attorney, Agent, or Firm* — Ladas & Parry LLP

(57) ABSTRACT

An embodiment of the present invention discloses a transparent display unit with improved transmittance. The transparent display unit comprises: an upper substrate comprising an upper transparent electrode and an upper alignment film in sequence from top to bottom; a lower substrate comprising a lower transparent electrode and a lower alignment film in sequence from bottom to top; and at least a colorful holographic polymer dispersed liquid crystal (H-PDLC) layer located between the upper substrate and the lower substrate.

4 Claims, 2 Drawing Sheets

(51) Int. Cl.
*G02F 1/1337* (2006.01)
*G02F 1/1335* (2006.01)

(56) References Cited

U.S. PATENT DOCUMENTS

| | | | |
|---|---|---|---|
| 5,875,012 A * | 2/1999 | Crawford et al. | 349/74 |
| 6,147,726 A * | 11/2000 | Kubota et al. | 349/74 |
| 6,166,800 A | 12/2000 | Silverstein et al. | 349/201 |
| 6,181,393 B1 * | 1/2001 | Enomoto et al. | 349/86 |
| 6,392,725 B1 * | 5/2002 | Harada et al. | 349/74 |
| 2002/0097355 A1 * | 7/2002 | Kralik et al. | 349/86 |
| 2008/0094551 A1 * | 4/2008 | Hayashi et al. | 349/106 |
| 2008/0186436 A1 * | 8/2008 | Chu et al. | 349/114 |
| 2010/0060825 A1 * | 3/2010 | Jang | B82Y 20/00 349/86 |
| 2010/0085520 A1 * | 4/2010 | Katayama | G02F 1/133753 349/114 |
| 2010/0208169 A1 * | 8/2010 | Mun et al. | 349/65 |
| 2011/0169877 A1 * | 7/2011 | Ishida | 345/690 |
| 2012/0218481 A1 * | 8/2012 | Popovich et al. | 349/11 |
| 2013/0101253 A1 * | 4/2013 | Popovich et al. | 385/37 |

FOREIGN PATENT DOCUMENTS

| | | |
|---|---|---|
| CN | 1534346 A | 10/2004 |
| CN | 101059607 A | 10/2007 |
| CN | 201725122 U | 1/2011 |
| CN | 102150076 A | 8/2011 |
| CN | 102253527 A | 11/2011 |
| CN | 102654687 A | 9/2012 |
| KR | 1020030077820 A | 10/2003 |
| KR | 100850022 B1 | 8/2008 |
| TW | 200834152 A | 8/2008 |

OTHER PUBLICATIONS

First Chinese Office Action dated Apr. 2, 2014; Appln No. 201210050681.3.
International Preliminary Report on Patentability Appln. No. PCT/CN2012/082803: Dated Sep. 2, 2014.
Second Chinese Office Action Appln. No. 201210050681.3; Dated Nov. 19, 2014.

* cited by examiner

TRANSPARENT DISPLAY UNIT

TECHNICAL FIELD

Embodiment of the present invention relates to a transparent display unit.

BACKGROUND

The need of people for portable information mediums has ever been increasing in recent years. In recent years, R&D has been actively conducted with respect to transparent display units. When a transparent display unit is applied with a voltage, the displayed information shown on the display is visible for a user, but when no voltage is applied, the object behind the display back is visible.

During R&D, the inventor noted at least the following problems in prior art: in the structure of an existing transparent display unit, the liquid crystal molecules are located between both polarization sheets and change the polarization direction of light by controlling the rotations of the liquid crystal molecules with applied voltages, so as to form different grey scales in cooperation with the polarization sheets, but the transmittance of the transparent display unit is greatly decreased by the existence of the polarization sheets.

SUMMARY

An embodiment of the present invention provides a transparent display unit, comprising: an upper substrate comprising an upper transparent electrode and an upper alignment film in sequence from top to bottom; a lower substrate comprising a lower transparent electrode and a lower alignment film in sequence from bottom to top; and at least a colorful holographic polymer dispersed liquid crystal (H-PDLC) layer located between the upper substrate and the lower substrate.

For example, the colorful H-PDLC layer comprises dichroic dye, negative liquid crystal and polymers.

For example, the upper alignment film and the lower alignment film are adapted for determining the orientation of the negative liquid crystal when a voltage is not applied to the colorful H-PDLC layer so as to make the refractive index of the negative liquid crystal match with the refractive index of the polymers.

For example, the transparent display unit comprises a plurality of pixel units, and each pixel unit comprises a transmitting region and a reflecting region.

For example, each of the upper alignment film and the lower alignment film comprises a transmitting region alignment film within the transmitting region. For example, a portion corresponding to the transmitting region alignment film in the colorful H-PDLC layer is transmissive type colorful H-PDLC, and the polymers contained in the transmissive type colorful H-PDLC are first polymers; when the transmissive type colorful H-PDLC is not applied with a voltage, the transmitting region alignment film makes the negative liquid crystal contained in the transmissive type colorful H-PDLC oriented perpendicular to surfaces of the upper substrate and the lower substrate; when the transmissive type colorful H-PDLC is applied with a voltage, the negative liquid crystal contained in the transmissive type colorful H-PDLC is parallel to the surface of the upper substrate, such that the refractive index of the negative liquid crystal does not match with the refractive index of the first polymers so as to cause diffraction of the incident light.

For example, each of the upper alignment film and the lower alignment film further comprises a reflecting region alignment film within the reflecting region. For example, a portion corresponding to the reflecting region alignment film in the colorful H-PDLC layer is reflective type colorful H-PDLC, and the polymers contained in the reflective type colorful H-PDLC are second polymers; when the reflective type colorful H-PDLC is not applied with a voltage, the reflecting region alignment film makes the negative liquid crystal contained in the reflective type colorful H-PDLC oriented at an acute angle between the surfaces of the upper substrate and the lower substrate; when the reflective type colorful H-PDLC is applied with a voltage, the negative liquid crystal contained in the reflective type colorful H-PDLC is parallel to the surface of the upper substrate, such that the refractive index of the negative liquid crystal does not match with the refractive index of the second polymers to cause reflection of the incident light.

For example, the transparent display unit comprises a plurality of colorful H-PDLC layers, the plurality of colorful H-PDLC layers are colorful H-PDLC layers of different colors and are spaced from each other with a transparent intermediate substrate, and the intermediate substrate further includes transparent electrodes and alignment films in this order on both the upper and lower sides, which are adapted for the colorful H-PDLC layers on both the upper and lower sides.

For example, a driver configuration is provided for each of the plurality of colorful H-PDLC layers.

For example, the transparent display unit further comprises: a colorless H-PDLC layer located below the lower substrate; and a light source located on the side of the colorless H-PDLC layer.

The transparent display unit provided by the embodiment of the present invention makes the refractive index of the negative liquid crystal match with the refractive index of the polymers, by the way of processing on the alignment film, so as to realize a transparent state; when a voltage is applied to the colorful H-PDLC layer through the transparent electrodes, the negative liquid crystal rotates along with the applied voltage, and the refractive index of the negative liquid crystal does not match with the refractive index of the polymers, realizing color display; furthermore, the magnitude of the applied voltage for the colorful H-PDLC layer is controlled so as to alter the matching extent of the refractive index of the negative liquid crystal with the refractive index of the polymers, and thus achieve the change of grey scales. The transparent display unit provided by the embodiment of the present invention improves the transmittance without using polarization sheets.

BRIEF DESCRIPTION OF THE DRAWINGS

In order to illustrate the technical solution of the embodiment of the present invention more clearly, a simple introduction of the drawings of embodiments will be afford in the following, and obviously, the drawings for the following description relate to only some of the embodiments of the present invention, but will not limit the present invention.

Figure 1:
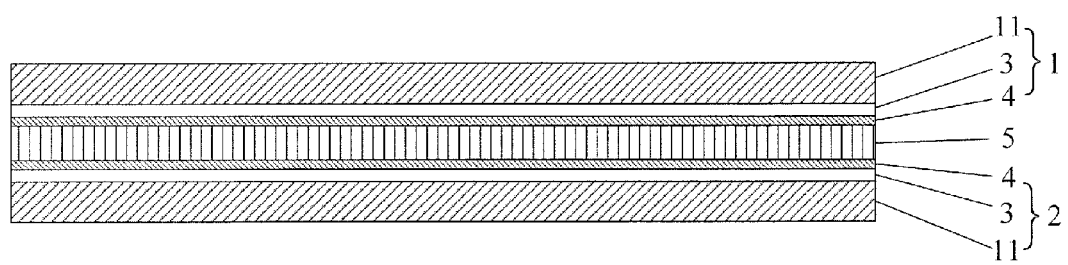
FIG. 1 is a structural schematic view showing one pixel unit of a transparent display unit according to an embodiment of the present invention.

Reference Numerals:

1-upper substrate; 11-glass sheet; 2-lower substrate; 3-transparent electrode; 4-alignment film; 5-colorful H-PDLC layer; 6-transmitting region; 7-reflecting region; 8-colorless H-PDLC layer; 9-light source.

DETAILED DESCRIPTION

To make clearer the aim, technical solutions and advantages of the embodiments of present invention, a clear and complete description about the technical solution of the embodiment of the present invention will be made with reference to the accompanying drawings of the embodiments of present invention. Obviously, the described embodiments are merely part of the embodiments of the present invention, but not all the embodiments. Based on the described embodiments of present invention, all the other embodiments acquired by the ordinary skilled in this art, without any creative labor, fall into the protective scope of the present invention.

In the present application, the wordings such as "upper", "lower", "inner", "outer" etc represent relative positional relationship, so as to facilitate illustration. The drawings are adapted only for the purpose of illustration, but not drawn according to ratio.

An embodiment of the present invention provides a transparent display unit, as shown in FIG. 1. The transparent display unit comprises an upper substrate 1 and a lower substrate 2, and a colorful holographic polymer dispersed liquid crystal (H-PDLC) layer 5 is located between the upper substrate 1 and the lower substrate 2. The Upper substrate 1 comprises a glass sheet 11, a transparent electrode 3 and an alignment film 4 from top to bottom in this order; the lower substrate 2 comprises a glass sheet 11, a transparent electrode 3 and an alignment film 4 from bottom to top in this order; that is, the transparent electrodes and the alignment films of the upper substrate 1 and the lower substrate 2 are all formed on the inner side of the display unit. For example, the glass sheet 11 can be replaced with a plastic sheet, a quartz sheet or the like, and the present invention is not limited thereto.

H-PDLC is a technology which applies the holography technology to a polymer dispersed liquid crystal material. The technology utilizes the phenomenon that a polymer dispersed liquid crystal system is subjected to light polymerization reaction under the effect of a laser interference optical field and generates phase separation, forming a refractive index modulation gating which comprises periodically distributed polymer-rich regions and liquid crystal-rich regions corresponding to the laser interference bright and dark fringes, respectively. The action of an external voltage may adjust the orientation of liquid crystal, and this therefore changes the refractive index of H-PDLC, causes the conversion of the H-PDLC between a transparent state and a reflective state, and forms different grey scales depending on the difference between the H-PDLC refractive indexes. For example, the colorful H-PDLC layer 5 comprises: a dichroic dye, negative liquid crystal, and polymers; the polymers may be formed of polymerizable monomers, and the polymerizable monomers may be a material such as acrylate, epoxy resin or the like. The alignment film 4 is used for establishing the orientation of the negative liquid crystal when the colorful H-PDLC layer 5 is not applied with a voltage, such that the refractive index of the negative liquid crystal matches with that of the polymers, that is, the refractive index of the negative liquid crystal equals to that of the polymers.

For example, a polyimide (PI) solution may be coated on the substrate for forming an alignment film, and after PI is cured, the alignment film is processed through rubbing or another orientation processing method; thereby the configuration of the surface of the alignment film is modified. For example, where the processing directions for the alignment films on the upper and lower upper substrates are in accordance, or where the rubbing direction for the upper substrate differs from that for the lower substrate by 180 degree, parallel orientation of the liquid crystal molecules between the upper and lower substrates can be achieved without any distortion angle.

The alignment film after the orientation process can make the negative liquid crystal contained in the colorful H-PDLC layer orientated perpendicular to the surface of the upper substrate; furthermore, because the liquid crystal orientation on the surface of the lower substrate is the same as the liquid crystal orientation on the surface of the upper substrate, the liquid crystal molecules are also perpendicular to the surface of the lower substrate when the orientation of the liquid crystal molecules is perpendicular to the surface of the upper substrate. At this time, the refractive index of the negative liquid crystal matches with that of the polymers, and the incident light can directly transmit through the colorful H-PDLC layer, thereby achieving a transparent state; when a voltage applied to the colorful H-PDLC layer through transparent electrodes, the negative liquid crystal rotates along with the change of voltage, and the refractive index of the negative liquid crystal does not match with that of the polymers any more, the incident light can be diffracted after entering the colorful H-PDLC layer, the matching extent of the refractive index of the negative liquid crystal with that of the polymers can be controlled by controlling the voltage applied to the colorful H-PDLC layer, thereby achieving the alteration of grey scales. When a voltage is not applied, the dichroic dye does not present colors, but when a voltage is applied, the dichroic dye rotates along with the rotation of the negative liquid crystal, thereby presenting colors.

The embodiment of the present invention realizes a transparent display unit by controlling the transmission and diffraction of a colorful H-PDLC layer by applying voltages, and, compared with the prior art, improves transmittance without using polarization sheets.

In another example, the transparent display unit comprises a plurality of pixel units, each of which comprises a transmitting region and a reflecting region, thus a transflective display unit can be achieved. These pixel units are arranged in an array, for example.

Figure 2:
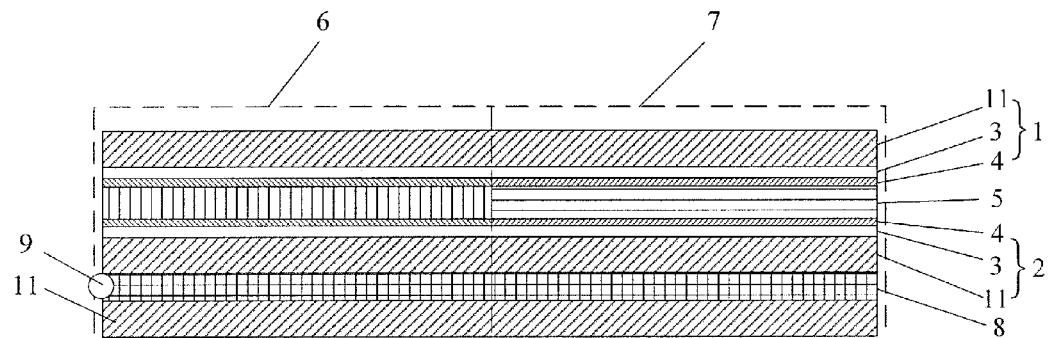
FIG. 2 is a structural schematic view showing one pixel unit of a transparent display unit according to another embodiment of the present invention.

As shown in FIG. 2, each pixel unit comprises a transmitting region 6 and a reflecting region 7. Accordingly, the alignment film 4 comprises a transmitting region alignment film in the transmitting region 6, and the portion of the colorful H-PDLC layer 5 corresponding to the transmitting region alignment film is transmissive type colorful H-PDLC. That is to say, the alignment film 4 in the transmitting region 6 is the transmitting region alignment film, and the colorful H-PDLC in the transmitting region 6 is transmissive type colorful H-PDLC. The polymers in the transmissive type colorful H-PDLC are first polymers; when the transmissive type colorful H-PDLC is not applied with a voltage, the transmitting region alignment film causes the orientation of the negative liquid crystal contained in the transmissive type colorful H-PDLC perpendicular to the surfaces of the upper substrate 1 and the lower substrate 2, and because the refractive index of the negative liquid crystal matches with that of the first polymers, the incident light can directly transmit the transmitting region 6, thereby achieving a transparent state. When the transmissive type colorful H-PDLC is applied with a voltage, the negative liquid crystal contained in the transmissive type colorful H-PDLC is parallel to the surface of the upper substrate 1, such that the refractive index of the negative liquid crystal does not match with that of the first polymers, which can be used for diffracting the incident light. The magnitude of the voltage applied to the transmissive type colorful H-PDLC can be controlled to change the matching extent of the refractive index of the negative liquid crystal with that of the first polymers, the display grey scales of the transmitting region 6 can be further adjusted.

Further, the alignment film 4 also comprises a reflecting region alignment film in the reflecting region 7, and the portion of the colorful H-PDLC layer 5 corresponding to the reflecting region alignment film is reflective type colorful H-PDLC. That is to say, the alignment film 4 in the reflecting region 7 is a reflecting region alignment film, and the colorful H-PDLC in the reflecting region 7 is reflective type colorful H-PDLC. The polymers contained in the reflective type colorful H-PDLC are second polymers. The reflecting region alignment film has different surface texture formed due to different processing from that of the transmitting region alignment film, thus the whole alignment film 4 can be divided into the transmitting region alignment film and the reflecting region alignment film. When a reflective type colorful H-PDLC is not applied with a voltage, the reflecting region alignment film gives rise to an acute angle between the orientation of the negative liquid crystal contained in the reflective type colorful H-PDLC and the surfaces of the upper substrate 1 and lower substrate 2; the specific angle is determined by the refractive index of the liquid crystal refractive index and the refractive index of the second polymers; at this time, the refractive index of the negative liquid crystal matches with that of the second polymers, the incident light can directly transmit through the reflecting region 7, thereby achieving a transparent state. When a reflective type colorful H-PDLC is applied with a voltage, the negative liquid crystal contained in the reflective type colorful H-PDLC is parallel to the surface of the upper substrate 1, such that the refractive index of the negative liquid crystal does not match with that of the second polymers, in which case the incident light is reflected. The magnitude of the voltage applied to the reflective type colorful H-PDLC can be controlled to alter the matching extent of the refractive index of the negative liquid crystal with that of the second polymers, and correspondingly the display grayscales of the reflecting region 7 are altered. Under a bright environment, an even better display effect can be achieved if the reflecting region 7 reflects ambient light.

Further, the aforesaid transparent display unit may further comprise a colorless H-PDLC layer 8 located below the colorful H-PDLC layer 5. The colorless H-PDLC layer 8 is located between the upper and lower glass sheets 11, and, for example, may share one glass sheet 11 with the colorful H-PDLC layer 5 provided thereon. A light source 9 is provided on one side of the colorless H-PDLC layer 8. The colorless H-PDLC layer 8 comprises liquid crystal and polymers therein, acting as a light guiding-plate. Because the liquid crystal micro-droplets within the colorless H-PDLC layer 8 can generate light scattering, and different interface anchoring effect causes the deviation of the order degree among the internal liquid crystal micro-droplets, accordingly leading to the deviation of the refractive indexes, and accordingly generates light scattering, the light rays are scattered internally, and the colorless H-PDLC layer 8 can act as a light guiding-plate. After horizontal light emitted from the side light source 9 enters the colorless H-PDLC layer 8, multiple deflection and reflection occur at the interfaces between the liquid crystal and polymers in the colorless H-PDLC layer 8, and the travel direction of light can be changed to emit upward the upper side, thereby providing a backlight for the transmitting region 6 and achieving a better display effect in dark environment. The light source 9 may be, for example, a line type light source such as cold cathode fluorescent lamp (CCFL) or, for example, a point type light source such as light-emitting diode (LED).

Figure 3:
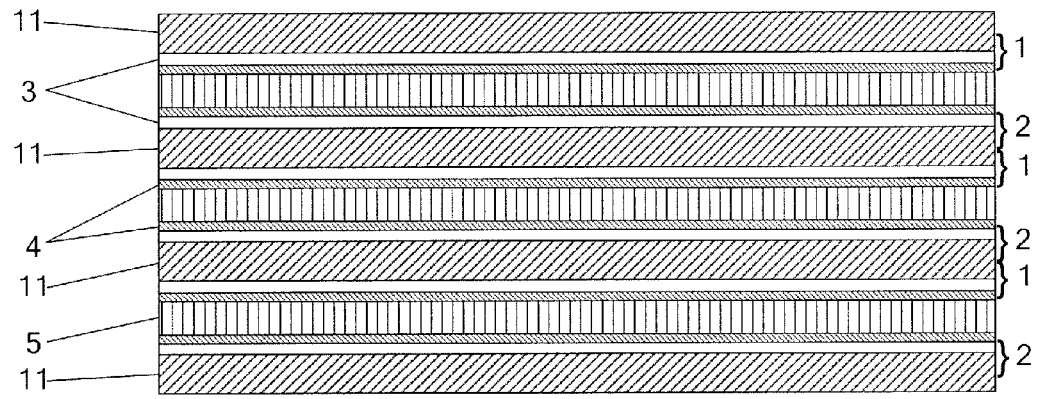
FIG. 3 is a structural schematic view showing one pixel unit or one sub-pixel unit of a transparent display unit according to another embodiment of the present invention.
Figure 4:
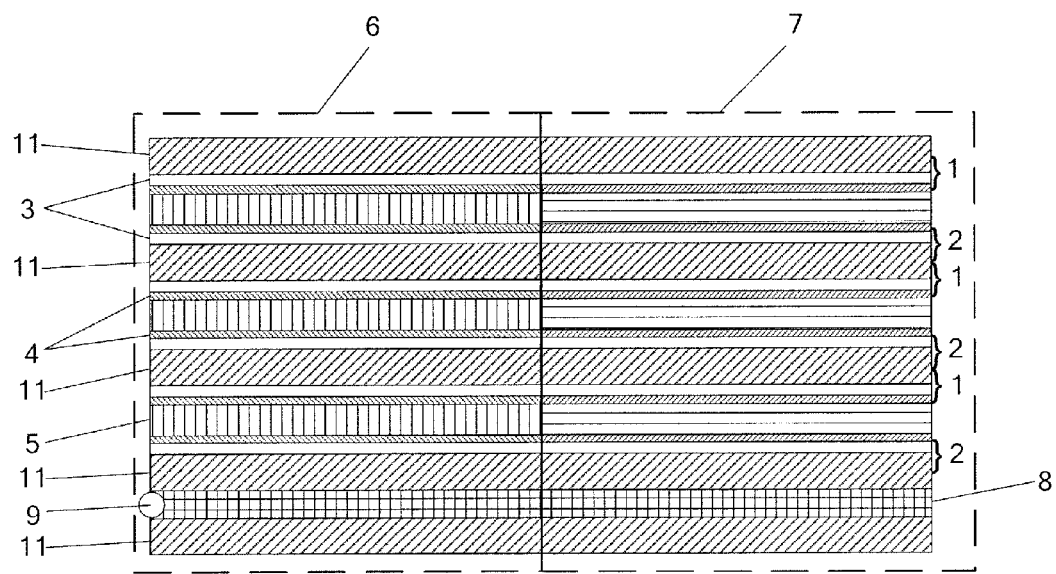
FIG. 4 is a structural schematic view showing one pixel unit or one sub-pixel unit of a transparent display unit according to another embodiment of the present invention.

In addition to the mono-layer colorful H-PDLCs as shown in FIGS. 1 or 2, which can be used for achieving a mono-color transparent display unit, the transparent display unit according to another embodiment of the present invention may further comprise colorful H-PDLC layers, as shown in FIGS. 3 or 4, for improving the effect of multicolor display and achieving colorful transparent display unit.

As shown in FIG. 3, when the colorful transparent display unit comprises a plurality of colorful H-PDLC layers 5, and these colorful H-PDLC layers may be arranged to be overlapped in the up-and-down direction so as to facilitate the manufacture of the transparent display unit. Each colorful H-PDLC layer 5 is provided with an upper substrate 1 and a lower substrate 2 on the upper and lower sides, and two adjacent colorful H-PDLC layers 5 can share one glass sheet 11 therebetween to form their own corresponding upper substrate 1 and lower substrate 2. The shared substrate may be called an intermediate substrate, and the upper and lower sides thereof may be each provided with a transparent electrode and an orientation layer, serving as the lower substrate of the colorful H-PDLC layer 5 at the upper side as well as the upper substrate of the colorful H-PDLC layer 5 at the lower side simultaneously. The colorful H-PDLC layers 5 are each located between an upper substrate 1 and a lower substrate 2; the upper and lower transparent electrodes 3 for each colorful H-PDLC layer 5 applies a voltage across each colorful H-PDLC layer 5; the colorful H-PDLC layers 5 each have a dichroic dye of a different color to form the colorful H-PDLC layer of the different color; for example, The colorful H-PDLC layers 5 may comprise a red H-PDLC layer, a blue H-PDLC layer and a green H-PDLC layer, corresponding to the three-primary colors.

In a further example, the colorful transparent display unit comprises a plurality of pixel units, each of which comprises a transmitting region and a reflecting region, hence achieving transflective colorful transparent display unit. These pixel units are arranged in an array, for example.

As shown in FIG. 4, each pixel unit comprises a transmitting region 6 and a reflecting region 7. In the transmitting region 6 and reflecting region 7, the alignment film as well as liquid crystal in each of the colorful H-PDLC layers 5 can be provided as the colorful H-PDLC layer 5 in the embodiment shown FIG. 2.

In a further example, the colorful transparent display unit may further comprise a colorless H-PDLC layer 8, and the colorless H-PDLC layer 8 is located below the colorful H-PDLC layers 5 and may share one glass sheet 11 with the lowest colorful H-PDLC layer 5. The side of the colorless H-PDLC layer 8 may be provided with a light source 9. The colorless H-PDLC layer 8 comprises liquid crystal and polymers therein, acting as a light guiding-plate. The light source 9 may be, for example, a line type light source such as the cold cathode fluorescent lamp (CCFL) or, for example, a point type light source such as light-emitting diode (LED).

It should be noted that, the structures as shown in FIGS. 3 or 4 may correspond to one pixel unit. For example, as to one pixel unit formed of three colorful H-PDLC layers, each colorful H-PDLC layer may be correspondingly provided with an individual array driver configuration, so that the red H-PDLC layer, the blue H-PDLC layer and the green H-PDLC layer can be driven respectively to achieve transparency or display. The array driver configuration for each layer, for example, comprises a plurality of gate lines and a plurality of data lines, these gate lines and data lines intersect with each other in order to define pixel units arranged in an array arrangement, and each pixel unit comprises a thin film transistor serving as a switching element and a pixel electrode used for controlling the liquid crystal arrangement. For example, of the thin film transistor of each pixel, the gate electrode is connected with or formed integrally with a corresponding gate line, the source electrode is connected with or formed integrally with a corresponding data line, and the drain electrode is connected with or formed integrally with a corresponding pixel electrode. The following description is made mainly with respect to a single or a plurality of pixel units, of course, other pixel units may be similarly formed.

As to the structure comprising three colorful H-PDLC layers, the gate lines and data lines of the array driver configurations of these layers may be driven by a same gate driver IC and a same source driver IC, respectively. With respect to the transflective display unit, each pixel unit comprises a transmitting region and a reflecting region that are adjacent to each other, and display of one pixel is achieved by overlapping the red H-PDLC layer, the blue H-PDLC layer and the green H-PDLC layer. For example, only the red H-PDLC layer presents its color, but the blue H-PDLC layer and the green H-PDLC layer are in the transparent state, thus one pixel presents in a red color. Similarly, other color display can be achieved by controlling the transparent state (grey scale) of each of the red, green and blue H-PDLC layers in each pixel unit.

The embodiments of the present invention control the transmission and display of a colorful H-PDLC layer with an applied voltage, thus improving the transmittance without using polarization sheets. Under a dark condition, on a prior art transparent display unit it is difficult for a user to watch clearly what is displayed due to reduced incident light, while the embodiment of the present invention, with the aid of a colorless H-PDLC layer and a light source in cooperation with transmitting regions as well as reflecting regions, a better display effect can be achieved under both dark or bright environment.

The transparent display units according to the embodiments of the present invention can be applied to various applications, including but not limited to TV television, cell phone, GPS etc.

The above description is related to only specific embodiments of the present invention, but the protective scope of the present invention is not limited thereto. It's easy for the ordinary skilled in the related art to conceive alternations and modifications within the scope disclosed in the present invention, all of which should be encompassed within the protective scope of the present invention. Therefore, the protective scope of the present invention should be accorded with the protective scope of the claims.

The invention claimed is:
1. A transparent display unit, comprising:
an upper substrate comprising an upper transparent electrode and an upper alignment film in sequence from top to bottom;
a lower substrate comprising a lower transparent electrode and a lower alignment film in sequence from bottom to top; and
at least a colorful holographic polymer dispersed liquid crystal (H-PDLC) layer located between the upper substrate and the lower substrate, wherein the H-PDLC layer comprises a refractive index modulation gating which comprises periodically distributed polymer-rich regions and liquid crystal-rich regions;
a plurality of pixel units, each pixel unit comprising a transmitting region and a reflecting region;
wherein the colorful H-PDLC layer comprises dichroic dye, negative liquid crystal and polymers;
each of the upper alignment film and the lower alignment film comprises a transmitting region alignment film within the transmitting region, and the upper alignment film and the lower alignment film comprise a reflecting region alignment film within the reflecting region, and the transmitting region alignment film and the reflecting region alignment film have different surface textures from each other;
a portion corresponding to the transmitting region alignment film in the colorful H-PDLC layer is transmissive type colorful H-PDLC, and the polymers contained in the transmissive type colorful H-PDLC are first polymers; and
a portion corresponding to the reflecting region alignment film in the colorful H~PDLC layer is reflective type colorful H-PDLC, and the polymers contained in the reflective type colorful H-PDLC are second polymers;
upon the transmissive type colorful H-PDLC being not applied with a voltage, the transmitting region alignment film makes the negative liquid crystal contained in the transmissive type colorful H-PDLC oriented perpendicular to surfaces of the upper substrate and the lower substrate to allow a refractive index of the negative liquid crystal to match with a refractive index of the first polymers; and upon the transmissive type colorful H-PDLC being applied with a voltage, the negative liquid crystal contained in the transmissive type colorful H-PDLC is parallel to the surface of the upper substrate to allow the refractive index of the negative liquid crystal to not match with the refractive index of the first polymers to cause diffraction of the incident light;
upon the reflective type the colorful H-PDLC being not applied with a voltage, the reflection region alignment film makes the negative liquid crystal contained in the reflective type colorful H-PDLC oriented at an acute angle between the surfaces of the upper substrate and the lower substrate to allow a refractive index of the negative liquid crystal to match with a refractive index of the second polymers, wherein the incident light can directly transmit through the reflecting region, thereby achieving a transparent state; and upon the reflective type the colorful H-PDLC being applied with a voltage, the negative liquid crystal contained in the reflective type colorful H-PDLC is parallel to the surface of the upper substrate to allow the refractive index of the negative liquid crystal to not match with the refractive index of the second polymers to cause reflection of the incident light.

2. The transparent display unit according to claim 1, comprising a plurality of colorful H-PDLC layers, the plurality of colorful H-PDLC layers are colorful H-PDLC layers of different colors and are spaced from each other with an intermediate substrate, and the intermediate substrate includes transparent electrodes and alignment films in this order on both the upper and rawer sides, which are adapted for the colorful H-PDLC layers on both the upper and lower sides.

3. The transparent display unit according to claim 2, wherein a driver configuration is provided for each of the plurality of colorful H-PDLC layers.

4. The transparent display unit according to claim 1, further comprising:
- a colorless H-PDLC layer located below the lower substrate;
- a light source located on the side of the colorless H-PDLC layer.

* * * * *